United States Patent
Kutka

(10) Patent No.: US 7,221,390 B1
(45) Date of Patent: May 22, 2007

(54) COMPUTER-ASSISTED MOTION COMPENSATION OF A DIGITIZED IMAGE

(75) Inventor: Robert Kutka, Geltendorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/959,804

(22) PCT Filed: Apr. 5, 2000

(86) PCT No.: PCT/DE00/01057

§ 371 (c)(1),
(2), (4) Date: Nov. 7, 2001

(87) PCT Pub. No.: WO00/69178

PCT Pub. Date: Nov. 16, 2000

(30) Foreign Application Priority Data

May 7, 1999 (DE) ................. 199 21 253

(51) Int. Cl.
*H04N 5/228* (2006.01)
*G06K 9/00* (2006.01)

(52) U.S. Cl. ............... 348/208.4; 348/208.6; 382/107

(58) Field of Classification Search ............ 348/208.4, 348/208.6, 208.13, 208.1, 218.1, 219.1, 442; 382/107, 265, 280, 260, 243
See application file for complete search history.

(56) References Cited

U.S. PATENT DOCUMENTS

| | | | |
|---|---|---|---|
| 5,282,044 A * | 1/1994 | Misawa et al. | 348/208.5 |
| 5,436,672 A | 7/1995 | Medioni et al. | |
| 5,497,191 A * | 3/1996 | Yoo et al. | 348/208.6 |
| 5,614,945 A * | 3/1997 | Sekine et al. | 348/207.99 |
| 5,926,212 A * | 7/1999 | Kondo | 348/207.99 |
| 6,473,458 B1 * | 10/2002 | Shimizu et al. | 375/240.11 |
| 6,628,711 B1 * | 9/2003 | Mathew et al. | 375/240.12 |

FOREIGN PATENT DOCUMENTS

| | | |
|---|---|---|
| EP | 614 318 | 9/1994 |
| EP | 631 432 | 12/1994 |
| WO | 99/12355 | 3/1999 |
| WO | 00/11874 | 3/2000 |

OTHER PUBLICATIONS

K. Uomori, "Electronic Image Stabilization System for Video Cameras and VCRs", SMPTE Journal, vol. 101, No. 2, 1992, pp. 66-75.

ITU-T, International Telecommunication Union, Telecommunications Sector Of ITU, Draft ITU-T Recommendation H. 263, "Video Coding for Low Bitrate Communication" May 2, 1996.

S. Balakirsky et al., "Performance Characterization Image Stabilization Algorithms" Proc. Int. Conf. On Image Processing, vol. 2, 3, 1996, pp. 413-416.

R. Gupta et al., "Background Compensation and an Active-Camera Motion Tracking Algorithm", Proc. of the 1997 Int. Conf. on Parallel Processing, pp. 431-440.

(Continued)

Primary Examiner—Lin Ye
(74) Attorney, Agent, or Firm—Staas & Halsey LLP

(57) ABSTRACT

Motion estimation is in each case carried out for the entire image, for that image and for a predetermined number of previous images, with an image motion vector being determined in each case. The images are stored in a memory having been compensated for motion, using the respective image motion vector. A predetermined area of the memory is read in order to form the motion-compensated image.

12 Claims, 6 Drawing Sheets

OTHER PUBLICATIONS

D. Wang et al., "Global Motion Parameter Estimation Using a Fast and Robust Algorithm", IEEE Trans. on Circuits and Systems for Video Tech., vol. 7, No. 1997, pp. 823-826.

P. Migliorati et al., "Multistage Motion Estimation for Image Interpolation", Signal Processing Image Communication, vol. 7, No. 3, Elsevier Science Publishers, Amsterdam, Sep. 1, 1995, pp. 187-199.

K. Kamikura et al., "Global Motion Compensation in Video Coding", Electronics & Communication in Japan, Part 1—Communications, US Scripta Technica, New York, vol. 78, No. 4, Apr. 1, 1995, pp. 91-101.

Y. Tse et al., "Global Zoom/Pan estimation and Compensation for Video Compression", International Conference on Acoustics, Speech and Signal Processing, ICASSP, New York, IEEE vol. Conf. 16, May 14, 1991, pp. 2725-2728.

K. Seo et al., "Hierarchical Block-Motion Estimation Using Linear Model-Based Postprocessing", Electronics Letters, IEE Stevenage, vol. 29, No. 22, Oct. 28, 1993, pp. 1915-1917.

H. Jozawa et al., "Two-State Motion Compensation Using Adaptive Global MC and Local Affine MC", IEEE Transactions on Circuits and Systems for Videotechnology, vol. 7, No. 1, Feb. 1, 1997, pp. 75-85.

* cited by examiner

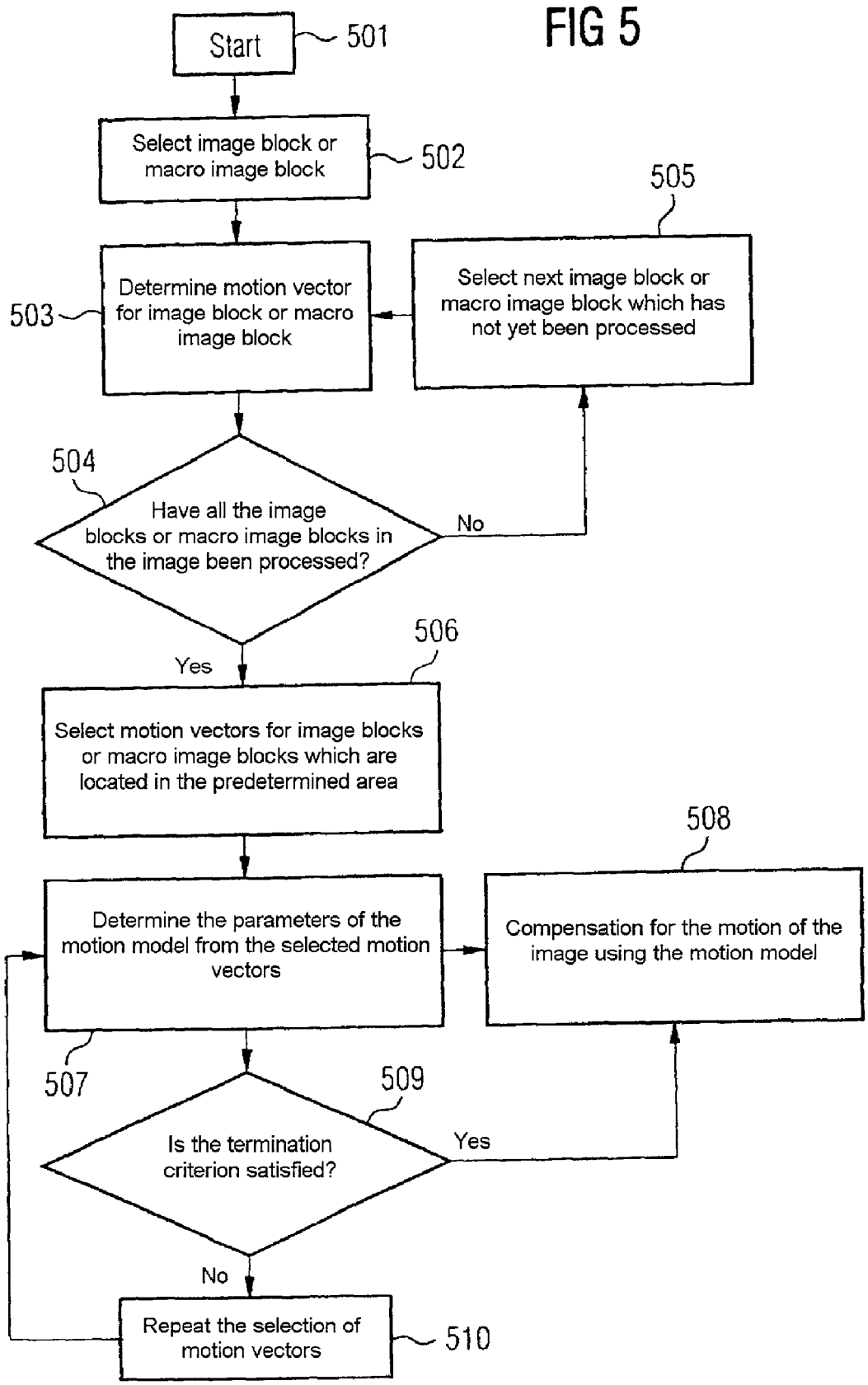

COMPUTER-ASSISTED MOTION COMPENSATION OF A DIGITIZED IMAGE

CROSS REFERENCE TO RELATED APPLICATIONS

This application is based on and hereby claims priority to German Application No. 19921253.8 filed on May 7, 1999, the contents of both of which are hereby incorporated by reference.

BACKGROUND OF THE INVENTION

1. Field of the Invention

The invention relates to methods and to computer-aided motion compensation in a digitized image.

2. Description of the Related Art

Such a method and system are known from K Uomori, A. Morimura, H. Ishii, Electronic image stabilization system for video cameras and VCRs, SMPTE Journal, Vol. 101, No. 2, pages 66–75, 1992. In this known method, an image is recorded by a camera, is digitized and is stored. The recorded digitized image has pixels which have associated coding information. The expression coding information means brightness information (luminance information) or color information (chrominance information).

The stored image is enlarged, and the coding information is interpolated between the original pixels in the unenlarged image. "Global" motion estimation, that is to say estimation of the motion of the entire image, and "global" motion compensation are applied to the entire enlarged image. Global motion estimation results in the formation of an image motion vector, which is associated with the enlarged image. A motion-compensated image detail is read from the enlarged image. The expression motion-compensated image detail means an image detail which has been shifted by the determined image motion vector within the enlarged image.

The motion compensation is carried out in order to compensate in particular for a jittering motion of a person when recording an image using a handheld camera.

The procedure known from Uomori, et al. has the particular disadvantage that the enlargement of the image reduces the image resolution of the camera, and this is perceptible as blurring in the motion-compensated image.

It is also known for mechanical means to be used for motion compensation. In an arrangement such as this, mechanical sensors are provided in a camera and measure any motion, for example a jittering motion, to which the camera is subject. A moving lens system is also provided which is controlled as a function of the determined motion such that the motion is compensated for, thus ensuring a stable, motion-compensated image before the image is actually recorded.

However, this technology has the disadvantage that it is considerably heavier due to the additional sensors and due to the lens system. Furthermore, the production of such system is expensive. This technology is therefore unsuitable, especially for small appliances, for example a mobile video telephone.

A block-based image coding method is known in accordance with the H.263 Standard from ITU-T, International Telecommunication Union, Telecommunications Sector of ITU, Draft ITU-T Recommendation H.263, Videocoding for low bitrate communication, May 2, 1996. Further methods for global motion estimation are known from S. B. Balakirsky, R. Chellappa, Performance characterization of image stabilization algorithms, Proc. Int. Conf. On Image Processing, Vol. 2, 3, pages 413–416, 1996, R. Gupta, M. C. Theys, H. J. Siegel, Background compensation and an active-camera motion tracking algorithm, Proc. Of the 1997 Int. Conf on Parallel Processing, pages 431–440, 1997 and D. Wang, L. Wang, Global Motion Parameter Estimation Using a Fast and Robust Algorithm, IEEE Trans. On Circuits and Systems for Video Tech., Vol. 7, No. 5, pages 823–826, 1997.

SUMMARY OF THE INVENTION

The invention is thus based on the problem of specifying methods and systems for motion compensation in a digitized image, which do not require any complex additional lens system and which avoid any reduction in the image resolution of the recorded image.

In one method for computer-aided motion compensation in a digitized image, motion estimation is in each case carried out for the entire image, for that image and for a predetermined number of previous images, with an image motion vector being determined. An image motion vector is thus determined in each case. The images are stored in a memory having been compensated for motion, using the respective image motion vector. A predetermined area of the memory is read in order to form the motion-compensated image.

In a further method for computer-aided motion compensation in a digitized image, the image is stored in a memory. Motion estimation is carried out for the entire image, and this results in an image motion vector. Furthermore, an area of the memory is read which comprises an image detail of the entire image. The position of the area in the image is found on the basis of a predetermined basic position, compensated for motion as a function of the determined image motion vector. The area of the memory at the determined position is read in order to form the motion-compensated image.

A system for computer-aided motion compensation in a digitized image has a processor which is set up such that the following steps can be carried out:

- motion estimation is in each case carried out for the entire image, for that image and for a predetermined number of previous images, with an image motion vector being determined in each case,
- the images are stored in a memory having been compensated for motion, using the respective image motion vector, and
- a predetermined area of the memory is read in order to form the motion-compensated image.

A further arrangement for computer-aided motion compensation in a digitized image comprises a processor which is set up such that the following steps can be carried out:

- the image is stored in a memory,
- motion estimation is carried out for the entire image, with an image motion vector being determined,
- an area of the memory which includes an image detail of the entire image is read,
- the position of the area in the image is found on the basis of a predetermined basic position, compensated for motion as a function of the determined image motion vector, and
- the area of the memory at the determined position is read in order to form the motion-compensated image.

A program is stored in a computer-legible storage medium and, once this program has been loaded in a memory in the computer, it allows a computer to carry out the following steps for motion compensation of a digitized image:

motion estimation is in each case carried out for the entire image, for that image and for a predetermined number of previous images, with an image motion vector being determined in each case, the images are stored in a memory having been compensated for motion, using the respective image motion vector, and a predetermined area of the memory is read in order to form the motion-compensated image.

A program is stored in a further computer-legible storage medium and, once this program has been loaded in a memory in the computer, it allows a computer to carry out the following steps for motion compensation in a digitized image:

the image is stored in a memory, motion estimation is carried out for the entire image, with an image motion vector being determined, an area of the memory which includes an image detail of the entire image is read, the position of the area in the image is found on the basis of a predetermined basic position, compensated for motion as a function of the determined image motion vector, and the area of the memory at the determined position is read in order to form the motion-compensated image.

A computer program product contains a computer-legible storage medium, in which a program is stored which allows a computer to carry out the following steps for motion compensation in a digitized image once said program has been loaded in a memory in the computer:

motion estimation is in each case carried out for the entire image, for that image and for a predetermined number of previous images, with an image motion vector being determined in each case, the images are stored in a memory having been compensated for motion, using the respective image motion vector, and a predetermined area of the memory is read in order to form the motion-compensated image.

A further computer program product comprises a computer-legible storage medium, in which a program is stored which allows a computer to carry out the following steps for motion compensation in a digitized image once said program has been loaded in a memory in the computer:

the image is stored in a memory, motion estimation is carried out for the entire image, with an image motion vector being determined, an area of the memory which includes an image detail of the entire image is read, the position of the area in the image is found on the basis of a predetermined basic position, compensated for motion as a function of the determined image motion vector, and the area of the memory at the determined position is read in order to form the motion-compensated image.

The invention specifies a cost-effective solution for motion compensation in a digitized image, which avoids any reduction in the image resolution of the camera. The motion-compensated image thus has better clarity than that produced by the method disclosed in Uomori, et al.

The developments described in the following text relate not only to the methods, the systems and the computer program products, but also to computer-readable storage media. The invention can be implemented both in software and in hardware, for example using a special electrical circuit. A development provides that each previous image is overwritten with motion compensation by the subsequent image in the memory, in overlapping areas of the images.

The invention is preferably used for coding and/or decoding a digitized image.

The invention is particularly suitable for use in a mobile telecommunications terminal, for example a mobile video telephone.

BRIEF DESCRIPTION OF THE DRAWINGS

These and other objects and advantages of the present invention will become more apparent and more readily appreciated from the following description of the preferred embodiments, taken in conjunction with the accompanying drawings of an exemplary embodiment of the invention, described in more detail in the following text, in which:

FIG. 5 is a flow chart illustrating the method steps in the method for determining the image motion vector for an image;

DETAILED DESCRIPTION OF THE PREFERRED EMBODIMENT

Figure 1:
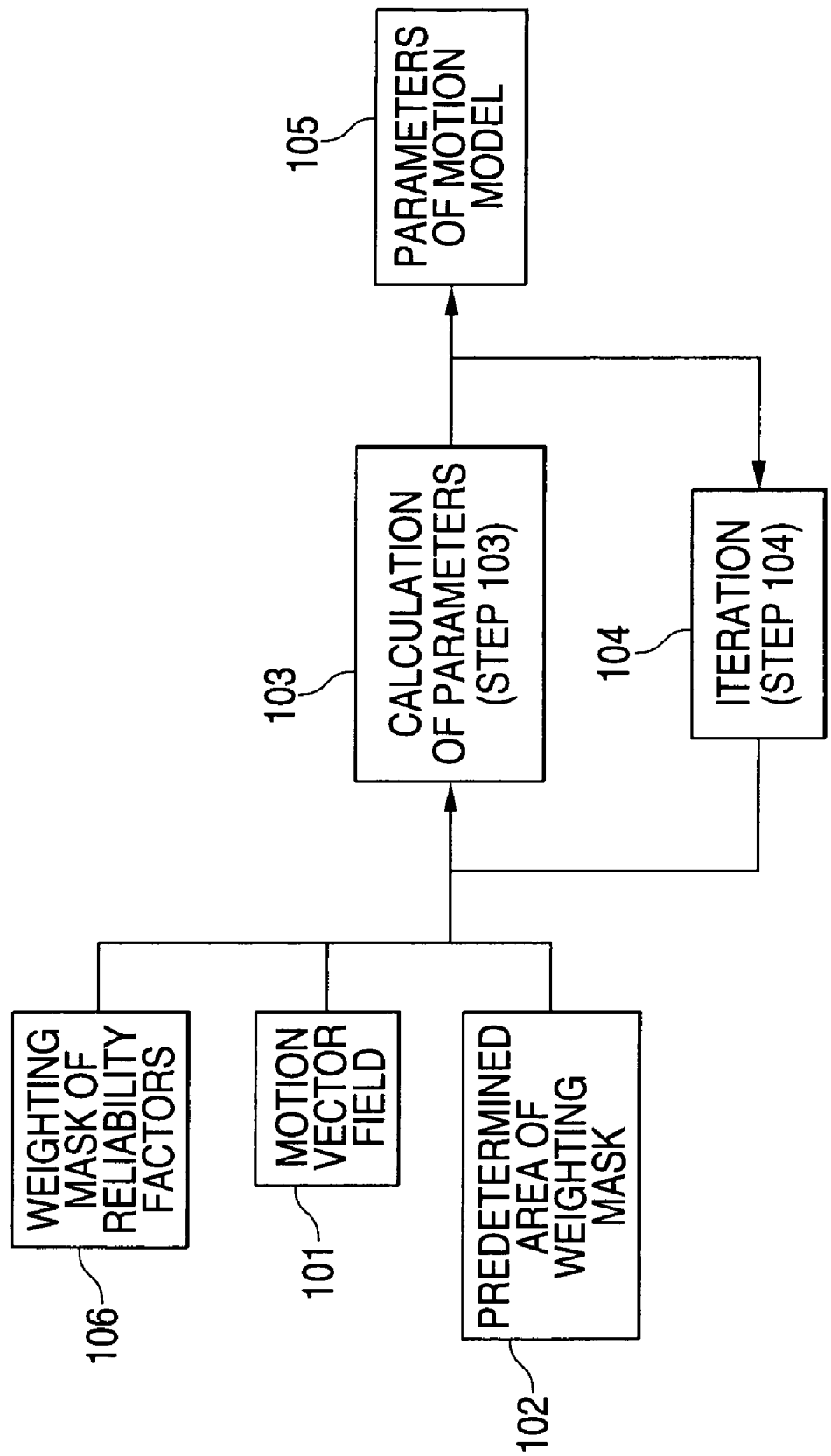
FIG. 1 is a block diagram illustrating the specific principle of the exemplary embodiment.

Reference will now be made in detail to the preferred embodiments of the present invention, examples of which are illustrated in the accompanying drawings, wherein like reference numerals refer to like elements throughout.

First Exemplary Embodiment

Figure 2:
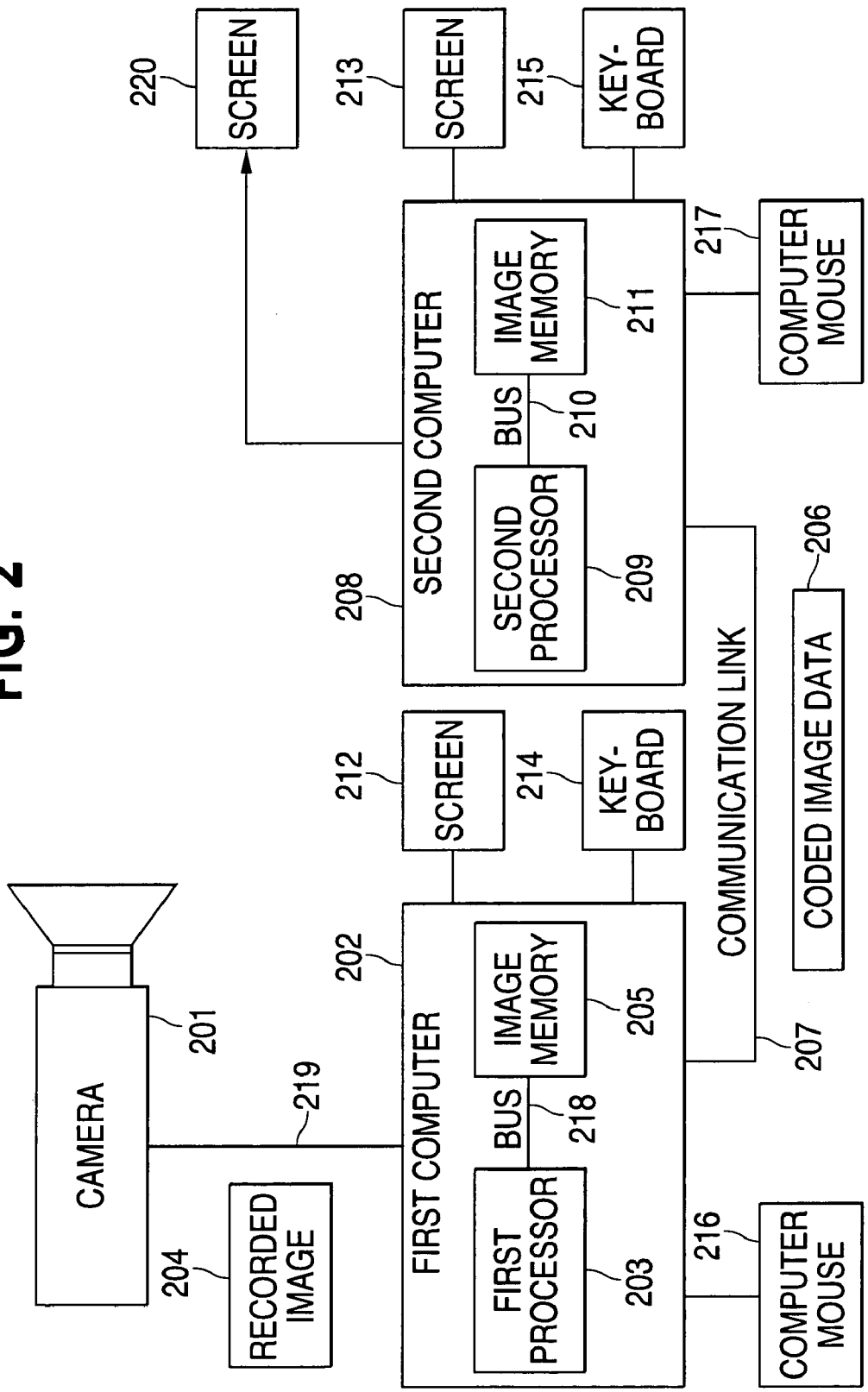
FIG. 2 is a block diagram of a system having a camera and a coding unit for coding the image sequence recorded by the camera, and for decoding the coded image sequence.

FIG. 2 shows a system which comprises two computers 202, 208 and a camera 201, illustrating image coding, transmission of the image data and image decoding.

A camera 201 is connected to a first computer 202 via a line 219. The camera 201 transmits recorded images 204 to the first computer 202. The first computer 202 has a first processor 203 which is connected via a bus 218 to an image memory 205. The first processor 203 in the first computer 202 carries out a method for image coding. In this way, coded image data 206 is transmitted from the first computer 202 via a communication link 207, preferably a line or a radio path, to a second computer 208. The second computer 208 contains a second processor 209, which is connected via a bus 210 to an image memory 211. The second processor 209 carries out a method for image decoding.

Both the first computer 202 and the second computer 208 have a respective screen 212 and 213, on which the image data 204 is visualized. Input units, preferably a keyboard 214 or 215, respectively, and a computer mouse 216 or 217, respectively, are provided for both the first computer 202 and the second computer 208.

The image data 204, which is transmitted from the camera 201 via the line 219 to the first computer 202, is data in the time domain, while the data 206 which is transmitted from the first computer 202 to the second computer 208 via the communication link 207 is image data in the frequency domain.

The decoded image data is displayed on a screen 220.

Figure 3:
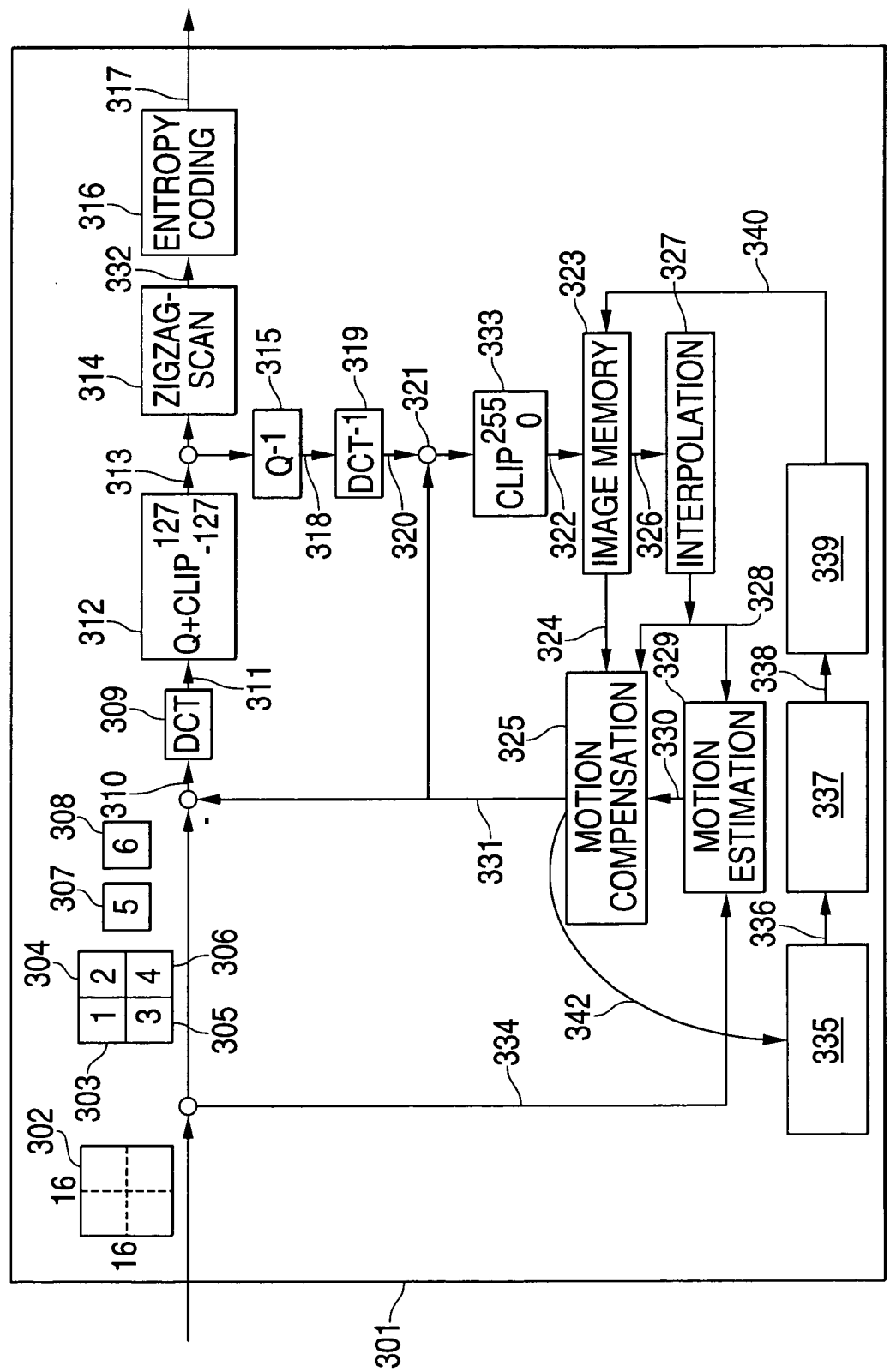
FIG. 3 is a detailed block diagram of a system for image coding and for global motion compensation.

FIG. 3 is a block diagram of a system for carrying out the method according to a first exemplary embodiment, within which a block-based image coding method is carried out.

A video data stream to be coded with successive digitized images is supplied to an image coding unit 301. The digitized images are subdivided into macroblocks 302, with each macroblock containing 16×16 pixels. The macroblock 302 comprises 4 image blocks 303, 304, 305 and 306, with each image block containing 8×8 pixels, which have associated luminance values (brightness values). Furthermore, each macroblock 302 comprises two chrominance blocks 307 and 308 with chrominance values (color information, color saturation) associated with the pixels.

The block of an image contains a luminance value (=brightness), a first chrominance value (=hue) and a second chrominance value (=color saturation). In this case, the luminance value, the first chrominance value and the second chrominance value are referred to as color values.

The image blocks are supplied to a transformation coding unit 309. In the case of difference image coding, values to be coded of image blocks from previous images are subtracted from the image blocks to be coded at that time, and only the subtraction information 310 is supplied to the transformation coding unit (discrete cosine transformation DCT) 309. To this end, the present macroblock 302 is signaled to a motion estimation unit 329 via a link 334. In the transformation coding unit 309, spectral coefficients 311 are formed for the image blocks or difference image blocks to be coded, and are supplied to a quantization unit 312.

Quantized spectral coefficients 313 are supplied both to a scanning unit 314 and to an inverse quantization unit 315, in a reverse path. After a scanning method has been carried out, for example a zigzag scanning method, entropy coding is applied to the scanned spectral coefficients 332 in an entropy coding unit 316 provided for this purpose. The entropy-coded spectral coefficients are transmitted to a decoder as coded image data 317 via a channel, preferably a line or a radio path.

Inverse quantization of the quantized spectral coefficients 313 is carried out in the inverse quantization unit 315. Spectral coefficients 318 obtained in this way are supplied to an inverse transformation coding unit 319 (inverse discrete cosine transformation IDCT). Reconstructed coding values (also difference coding values) 320 are supplied in a difference image mode to an adder 321. The adder 321 furthermore receives coding values for an image block, which are obtained from a previous image on the basis of motion compensation that has already been carried out. The adder 321 is used to form reconstructed image blocks 322, which are stored in an image memory 323.

Chrominance values 324 of the reconstructed image blocks 322 are supplied from the image memory 323 to a motion compensation unit 325. Interpolation for brightness values 326 is carried out in an interpolation unit 327 provided for this purpose. The interpolation process is preferably used to double the number of brightness values contained in the respective image block. All the brightness values 328 are supplied both to the motion compensation unit 325 and to the motion estimation unit 329. The motion estimation unit 329 also receives the image blocks of the respective macroblock (16×16 pixels) to be coded, via the link 334. The motion estimation process is carried out in the motion estimation unit 329 taking account of the interpolated brightness values ("motion estimation on a half-pixel basis").

The motion estimation process results in a motion vector 330 which expresses any shift in the position of the selected macroblock from the previous image to the macroblock 302 to be coded.

Both brightness information and chrominance information related to the macroblock determined by the motion estimation unit 329 are shifted by the motion vector 330, and are subtracted from the coding values of the macroblock 302 (see data path 231).

The motion estimation process is carried out by determining an error E, for each image block for which motion estimation is carried out, with respect to a region of the same shape and size as the image block in a previous image, for example using the following rule:

$$E = \sum_{i=1}^{n} \sum_{j=1}^{m} |x_{i,j} - xd_{i,j}| \rightarrow \min \forall d \in S, \tag{1}$$

where
- i, j are each indices,
- n, m represents a number (n) of pixels along a first direction x and, respectively, a number (m) of pixels along a second direction y, which are contained in the image block,
- xi, j is coding information which is associated with a pixel at the relative position denoted by the indices i, j in the image block,
- xdi, j is coding information which is associated with the respective pixel denoted by i, j in the region of the previous image, shifted by a value d which can be predetermined,
- S is a search area of predetermined shape and size in the previous image.

The error E is calculated for each image block for various shifts within the search area S. The image block in the previous image whose error E is the minimum is selected as being the most similar to that image block for which the motion estimation is carried out.

The motion estimation process thus results in the motion vector 330 which has two motion vector components, a first motion vector component $BV_x$ and a second motion vector component $Bv_y$ along the first direction x and the second direction y:

$$BV = \begin{pmatrix} BV_x \\ BV_y \end{pmatrix}. \tag{2}$$

The motion vector 330 is associated with the image block.

The image coding unit from FIG. 3 thus produces a motion vector 330 for all the image blocks or macro image blocks.

The motion vectors 330 are supplied to a unit for selection and/or weighting of the motion vectors 330. In the unit for selection of the motion vectors 335, the motion vectors 330 which are selected and/or are provided with high weightings are those which are associated with image blocks which are located in a predetermined area 401 (see FIG. 4a). Furthermore, the unit 335 is used to select and/or to provide high weightings for those motion vectors which have been estimated as being reliable (342).

The selected motion vectors 336 are supplied to a unit for determining the parameters for the motion model 337. The motion model as described in the following text and as shown in FIG. 1 is determined from the selected motion vectors in the unit for determining the parameters for the motion model 337.

The determined motion model 338 is supplied to a unit for compensation 339 for the motion between the camera and the recorded image. The motion is compensated for in the unit for compensation 339 using a motion model which is described in the following text, so that an image 340, whose motion is compensated for, is stored once again, after the processing in the unit for compensation 339, in the image memory 323 in which the image which had not previously been processed but whose motion is to be compensated for is stored.

FIG. 1 shows the principle on which the global motion determination is based, in the form of a block diagram.

The parameters for the motion model 338 described in the following text are calculated (step 103) on the basis of a motion vector field 101, the predetermined area or a weighting mask 102, and a weighting mask of reliability factors 106.

The expression motion vector field 101 is intended to mean a set of all the determined motion vectors 330 relating to an image. In FIG. 4b, the motion vector field 101 is represented (402) by dashed lines, which each describe a motion vector 330 for one image block. The motion vector field 402 is sketched on the digitized image 400. The image 400 comprises a moving object 403 in the form of a person, and an image background 404.

Figure 4A:
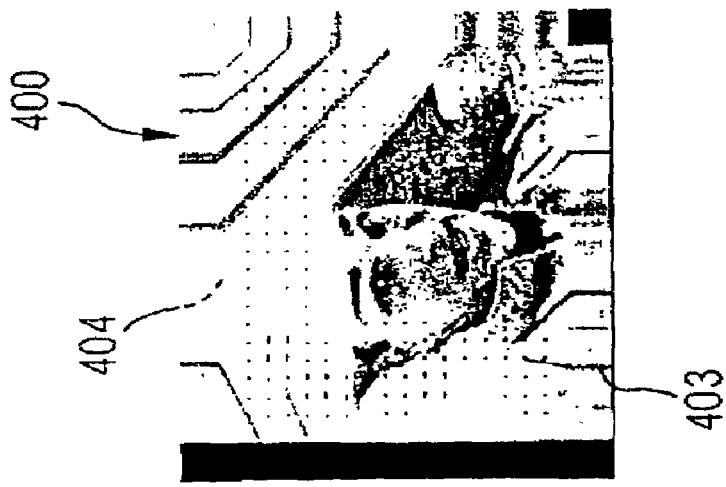
FIGS. 4a to 4c each show an image in which a motion vector field is established for the image, showing a comparison to a previous image with a predetermined area (FIG. 4a) from which the motion vectors are in each case determined in order to form parameters for a motion model, an image with all the motion vectors (FIG. 4b), and an image with motion vectors after one iteration of the method with the predetermined area illustrated in FIG. 4a (FIG. 4c)
Figure 4B:
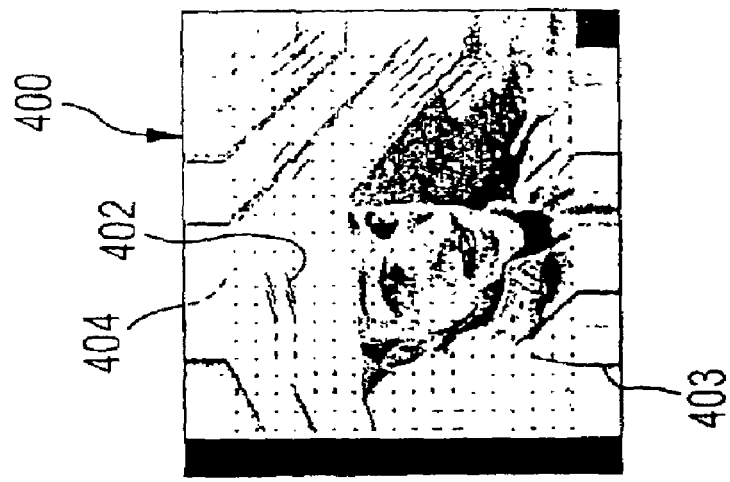

FIG. 4a shows a predetermined area 401. The predetermined area 401 indicates a region in which the image blocks must lie in order that the motion vectors which are associated with these image blocks are selected.

The predetermined area 401 is obtained from an edge area 405 which is formed by image blocks which are located at a predetermined first distance of 406 from one edge 407 of the digitized image 400. This means that image blocks directly adjacent to the edge 407 of the image 400 are ignored when determining the parameters for the motion model 338. Furthermore, the predetermined area 401 is formed by image blocks which are located at a predetermined second distance 408 from the center 409 of the digitized image 400.

The predetermined area or the weighting mask is changed using an iterative method with the following steps, in order to form a new area for the subsequent iteration (step 104).

A vector difference value VU is in each case determined for each image block in the predetermined area 401 and is used to describe the difference between the determined motion model 338 and the motion vector 330 with which the respective image block is associated. The vector difference value VU is formed, for example, using the following rule:

$$VU = |BV_X - MBV_X| + |BV_Y - MBV_Y|, \quad (3)$$

where $MBV_x$ and $MBV_y$ each denote the components of an image motion vector MBV calculated on the basis of the motion model.

The process for determining the model-based image motion vector is explained in more detail in the following text.

When using a binary mask, an image block is contained in the new area of the further iteration when the respective vector difference value VU is less than a threshold value $\epsilon$ which can be predetermined. However, if the vector difference value VU is greater than the threshold value $\epsilon$, then the image block with which the respective motion vector is associated is no longer considered in the new predetermined area.

When using a weighting mask, the weighting factors for the blocks are specified in the opposite ratio to this vector difference value VU.

This procedure results in those motion vectors which differ considerably from the image motion vectors MBV calculated from the determined motion model not being considered, or being considered only to a minor extent, in the calculation of the parameters for the motion model in a further iteration.

Once the new area or the new weighting mask has been formed, the motion vectors which are associated with image blocks which are contained in the new area are used, possibly in addition to the weighting mask, to determine a new parameter set for the motion model.

The method described above is carried out in a number (which can be predetermined) of iterations or until a termination criterion is satisfied, for example the number of blocks eliminated in an iteration step falls below a specific number.

In this case, the new area are in each case used as the predetermined area or the new weighting mask in addition to the old motion vectors, as input variables for the next iteration.

The global motion is determined by determining parameters in a model for the global camera motion.

In order to explain the motion model, the following text contains a detailed derivation of the motion model:

It is assumed that a natural, three-dimensional scene is imaged, using the camera, onto a two-dimensional projection plane. An image of a point $$\underline{p}_0 = (x_0, y_0, z_0)^T \quad (4)$$

is formed using the following rule:

$$\begin{pmatrix} X \\ Y \end{pmatrix} = \frac{F}{z_0} \begin{pmatrix} x_0 \\ y_0 \end{pmatrix} \wedge z_0 \gg F, \quad (5)$$

where F is a focal length and X, Y are coordinates of the imaged point $p_0$ on the image plane.

If the camera is now moved, then the imaging rule remains synchronized to the coordinate system, which moves with the camera, but the coordinates of the object points must be transformed to this coordinate system. Since all camera motions can be regarded as an accumulation of rotation and translation, the transformation from the fixed coordinate system (x, y, z) to the jointly moving coordinate system ($\tilde{x}_0$, $\tilde{y}_0$, $\tilde{z}_0$) can be formulated on the basis of the following rule:

$$\begin{pmatrix} \tilde{x}_0 \\ \tilde{y}_0 \\ \tilde{z}_0 \end{pmatrix} = \begin{pmatrix} r_{11} & r_{12} & r_{13} \\ r_{21} & r_{22} & r_{23} \\ r_{31} & r_{32} & r_{33} \end{pmatrix} \cdot \begin{pmatrix} x_0 \\ y_0 \\ z_0 \end{pmatrix} + \begin{pmatrix} t_1 \\ t_2 \\ t_3 \end{pmatrix}. \quad (6)$$

Based on rule (6), any image change caused by camera motion is modeled in accordance with the following rule:

$$\begin{pmatrix} \Delta X \\ \Delta Y \end{pmatrix} = \begin{pmatrix} C_F \cos(\varphi_z) - 1 & -C_F \sin(\varphi_z) \\ C_F \sin(\varphi_z) & C_F \cos(\varphi_z) - 1 \end{pmatrix} \cdot \begin{pmatrix} X \\ Y \end{pmatrix} + \begin{pmatrix} t_X \\ t_Y \end{pmatrix}, \quad (7)$$

where $\Delta X$, $\Delta Y$ is a coordinate change of the pixels, resulting from the described camera motion in a time interval $\Delta t$, and $\varphi z$ is the angle through which the camera has been rotated about a z-axis in this time interval $\Delta t$. A predetermined factor CF denotes any focal length change or translation along the z-axis.

The equation system described in rule (7) is non-linear, and it is therefore impossible to determine the parameters in the equation system directly.

For this reason, a simplified motion model is used for faster calculation, in which the camera motion in the imaging plane is used by a motion model with 6 parameters, which are formed using the following rule:

$$\begin{pmatrix} \tilde{X}_0 \\ \tilde{Y}_0 \end{pmatrix} = \begin{pmatrix} r'_{11} & r'_{12} \\ r'_{21} & r'_{22} \end{pmatrix} \cdot \begin{pmatrix} X_0 \\ Y_0 \end{pmatrix} + \begin{pmatrix} t'_X \\ t'_Y \end{pmatrix}. \quad (8)$$

The equation system obtained from this with the data for the motion vector field is now solved by linear regression, with the complexity corresponding to inversion of a symmetrical 3×3 matrix.

After determining the parameters $r'_{11}$, $r'_{12}$, $r'_{21}$, $r'_{22}$, $t'_X$, and $t'_Y$, the parameters in rule (7) are approximated using the following rules:

$$\underline{T} = \underline{T}', \quad (9)$$

$$C_F = \sqrt{\left| \det \begin{pmatrix} r'_{11} & r'_{12} \\ r'_{21} & r'_{22} \end{pmatrix} \right|}, \quad (10)$$

$$\rho_z = \arcsin \frac{1}{2}(r'_{21} - r'_{12}). \quad (11)$$

Figure 4C:
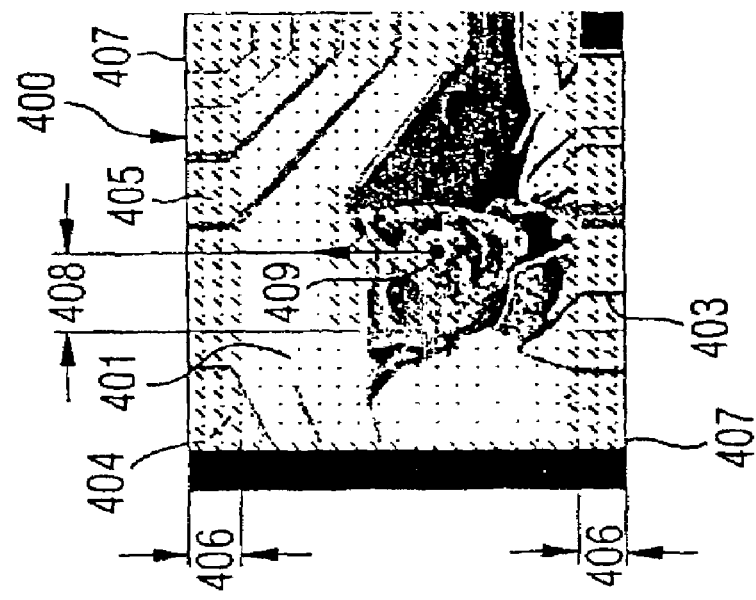

FIG. 4c shows the motion vectors which are associated with those image blocks which are located in the predetermined area 401. In this case, the predetermined area 401 is changed from the predetermined area 401 from FIG. 4a by one iteration (step 104).

These parameters are used to determine the image motion vector for the image which describes the motion to which the image is subject relative to the camera recording the image.

Each image in the chronological sequence of images is stored in the image memory 323, shifted by the respective image motion vector which has been determined for that image. The image memory 323 is larger than the camera format used to record the sequence of images. Thus, specifically that section of the camera, represented by the reconstructed image, within the image memory 323 is shifted by the respective image motion vector, and is then stored, compensated for that motion. When a current, movement-compensating image is being stored, areas in the image memory to which previous images have already been written are overwritten by the new image.

Figure 6:
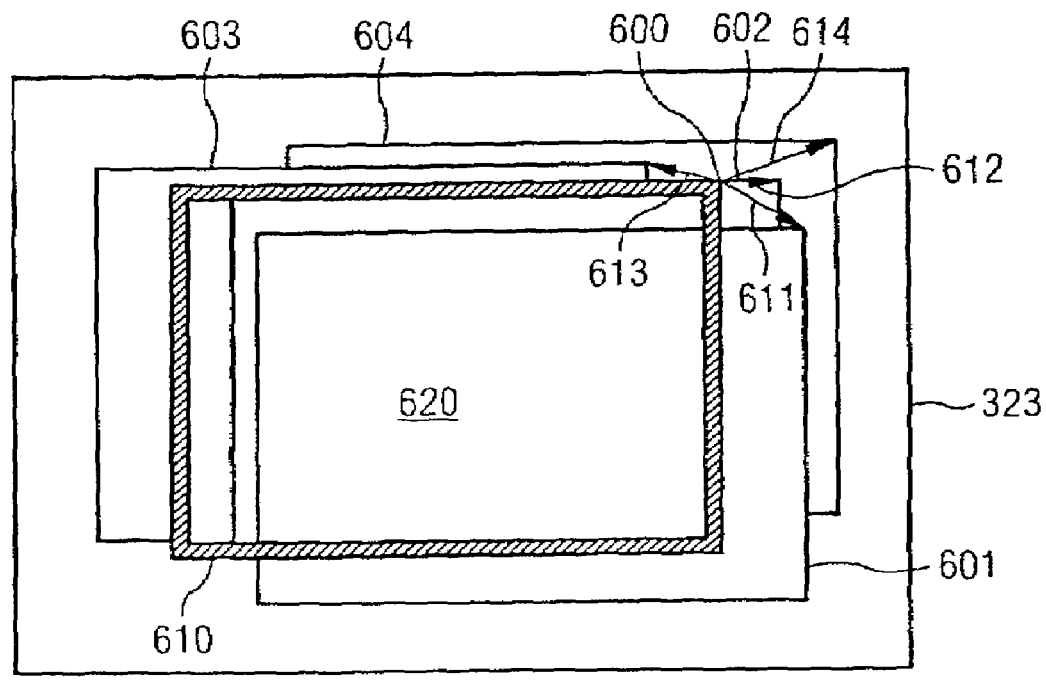
FIG. 6 is a sketch illustrating the storage of previous images according to a first exemplary embodiment.

This procedure is illustrated symbolically in FIG. 6 by four images 601, 602, 603, 604. Each of these four images 601, 602, 603, 604 is shifted from a basic position 600 by a vector corresponding to the image motion vector 611, 612, 613, 614 associated with the respective image 601, 602, 603, 604.

The image information within the image memory 323 and which is contained in an area 610 of the image memory 323 which contains the basic position 600 at the upper right-hand edge of the area 610 is read as the motion-compensated image for the image that is currently to be coded or displayed.

The read image is denoted by the reference symbol 620 in FIG. 6.

If the background of the recorded image sequence is a fixed object, for example a landscape or the rear wall of a video conference room, then a relatively large cohesive area of the actual image background builds up over time after coding and motion-compensated storage of a number of images in the image memory 323, caused in particular by different camera viewing points during recording of the image sequence.

The same area 620 is always read from the image memory 323, that is to say for each image.

The individual method steps of the method will be described once again with reference to FIG. 5:

After the start of the method (step 501), an image block or macro image block is selected (step 502). A motion vector is determined for the selected image block or macro image block (step 503), and a check is carried out in a further step (step 504) to determine whether all the image blocks or macro image blocks for the image have been processed.

If this is not the case, then a further image block or macro image block which has not yet been processed is selected in a further step (step 505).

If, however, all the image blocks or macro image blocks have been processed, then those motion vectors are selected which are associated with an image block or a macro image block and which lie in the predetermined area (step 506).

The parameters for the motion model are determined from the selected motion vectors (step 507). If a further iteration needs to be carried out, that is to say the stated number of iterations has not yet been reached or the termination criterion is not yet satisfied, then a new area is defined in a further step (step 509), and the weighting mask for the next iteration is calculated (step 510) as a function of the vector difference values VU.

This is followed by compensation for the motion of the image using the determined motion model (step 508).

A number of alternatives to the exemplary embodiment described above are explained in the following text:

The shape of the area is in principle undefined and is preferably dependent on prior knowledge of a scene. Those image areas which are known to differ considerably from the global motion should not be used to determine the motion model.

The area should contain only motion vectors of image areas which have been found to be reliable on the basis of the reliability values 342 in the motion estimation method.

In general, the motion estimation can be carried out using any desired method, and is in no way restricted to the principle of block matching. Thus, for example, motion estimation can also be carried out using dynamic programming.

The nature of the motion estimation and hence the way in which a motion vector is determined for an image block are thus not relevant to the invention.

Alternatively, in order to determine the parameters in the equation system (7) approximately, it is possible to linearize the sine terms and cosine terms in the rule (7).

This therefore results in the following rule for small angles ρZ $$\begin{pmatrix} \Delta X \\ \Delta Y \end{pmatrix} = \begin{pmatrix} C_F - 1 & -C_F \omega_z \\ C_F \omega_z & C_F - 1 \end{pmatrix} \cdot \begin{pmatrix} X \\ Y \end{pmatrix} + \begin{pmatrix} t_X \\ t_Y \end{pmatrix} = \begin{pmatrix} R_1 & -R_2 \\ R_2 & R_1 \end{pmatrix} \cdot \begin{pmatrix} X \\ Y \end{pmatrix} + \begin{pmatrix} t_X \\ t_Y \end{pmatrix}. \quad (12)$$

Since the equations for ΔX and ΔY cannot be optimized independently mutually, the least sum of the squares is formed, that is to say using the following rule:

$$\sum_V [(\Delta X_\eta - R_1 X_\eta + R_2 Y_\eta - t_x)^2 + (\Delta Y_\eta - R_2 X_\eta + R_1 Y_\eta - t_y)^2] \to \min \quad (13)$$

In this case, $\Delta X_\eta$, $\Delta Y_\eta$ denote the X and Y components of the motion vector of the image block η at the position $X_\eta$, $Y_\eta$ of the predetermined area V of the image.

According to equation (12), R1, R2, tx and ty are the motion model parameters to be determined.

Once the optimization process has been carried out, the associated model-based motion vector MBV (ΔX ΔY) is established on the basis of the determined equation system (12) by substitution of the X and Y components in the respective macroblock.

Instead of the areas mentioned above, weighting masks Ax, Ay, which separately represent the reliability of the motion vectors, the a priori knowledge and the conclusions from the VUs in iterative procedures for the X and Y components of the motion vectors are used in the calculation of the parameters for the motion model in accordance with the following optimization rule:

$$\sum_V \begin{bmatrix} (\alpha_{X_\eta} \cdot (\Delta X_\eta - R_1 X_\eta + R_2 Y_\eta - t_x))^2 + \\ (\alpha_{Y_\eta} \cdot (\Delta Y_\eta - R_2 X_\eta + R_1 Y_\eta - t_x))^2 \end{bmatrix} \to \min \quad (14)$$

$$\alpha_{X_\eta} \in A_X, \alpha_{Y_\eta} \in A_y.$$

A weighting mask Ax, Ay, for the reliability of the motion vectors (105) can be calculated, for example, by calculating the values αx, αy for an image block during block matching, as follows:

$$\alpha_x = \frac{1}{SAD_{match}} \cdot \sum_N \frac{|SAD_\eta - SAD_{match}|}{|x_\eta - x_{match}|}, \quad (15)$$

$$\alpha_y = \frac{1}{SAD_{match}} \cdot \sum_N \frac{|SAD_\eta - SAD_{match}|}{|y_\eta - y_{match}|}, \quad (16)$$

where $SAD_\eta$, is the sum of the pixel differences in a block for the η-th shift ($x_\eta$, $y_\eta$) in the block matching process, SADmatch represents the same for the best, finally chosen region ($x_{match}$, $y_{match}$), and N is the total number of search positions which have been investigated. If this value is calculated taking account, for example, of only the 16 best regions, then the block matching process can be carried out as a "spiral search", with the SAD of the poorest of the 16 chosen regions as the termination criterion.

A further option for calculating a weighting mask $A_x = A_y = A$ for the reliability of the motion vectors is provided by:

$$\alpha = \Sigma \frac{SAD - SAD_{match}}{N}, \quad (17)$$

where $\alpha = \alpha_x = \alpha_y$ is the weighting factor of an image block or of its motion vector.

The invention can be used, for example, to compensate for motion of a moving camera or else to provide motion compensation for a camera which is integrated in a mobile communications appliance (portable video telephone).

Second Exemplary Embodiment

Figure 7:
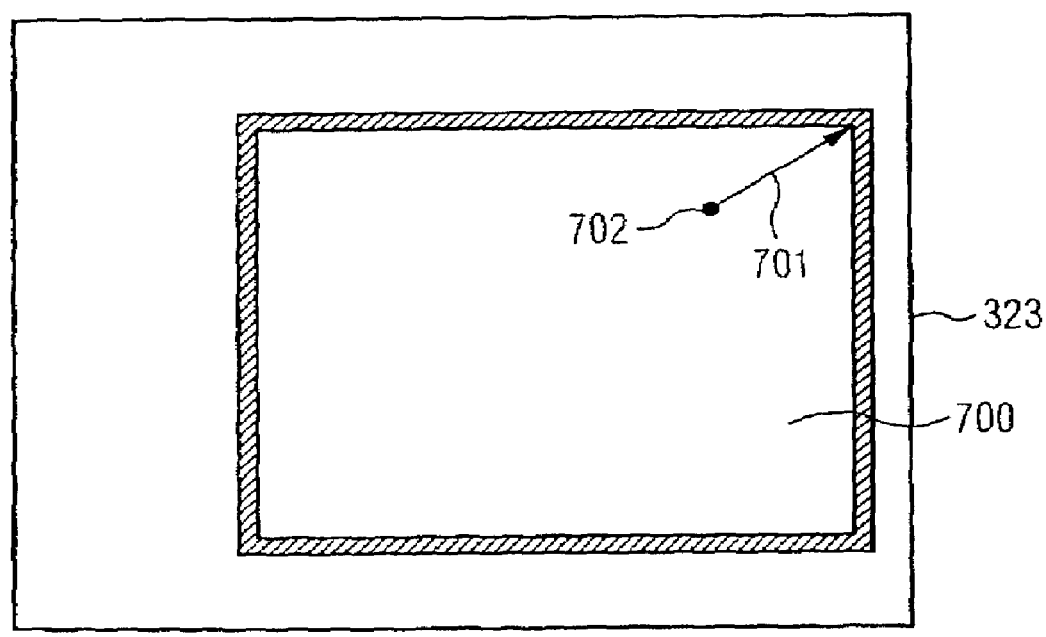
FIG. 7 is a sketch illustrating the selection of an area for selection of an image detail for motion compensation in an image according to a second exemplary embodiment.

FIG. 7 shows the image memory 323 with a symbolic representation of the storage and reading of the image, according to a second exemplary embodiment.

For the purposes of this exemplary embodiment, it is assumed that the camera is recording an image using a larger image format than is required for the image output.

The method corresponds essentially to the first exemplary embodiment, with the difference that an image detail 700 is now read from the image memory 323 after the motion estimation process has been carried out, and is shifted by the determined image motion vector 701 starting from a basic position 702.

It should be noted that the motion compensation for the image is carried out before the transformation coding of the individual image blocks, in order that it is possible to use a coder with which the image format of the image to be output is processed. This clearly means that the motion compensation is in this case carried out "upstream" of the coder.

Alternatives to the exemplary embodiments described above are described in the following text:

The method for motion compensation is not dependent on the chosen method for motion estimation, that is to say any desired methods can be used to determine the image motion vector.

The invention has been described in detail with particular reference to preferred embodiments thereof and examples, but it will be understood that variations and modifications can be effected within the spirit and scope of the invention.

The invention claimed is:

1. A method for computer-aided motion compensation in a digitized image, comprising:
   estimating motion for an entire image, and for a predetermined number of previous images, with a respective image motion vector being determined for each according to a basic position of a first predetermined area of memory;

storing in a chronological sequence of images, the entire image and the previous images in a memory having been compensated for motion, using the respective image motion vector, where the memory is larger than a format of the entire image, thereby overwriting at least a portion of each previous image, with motion compensation by a subsequent image in the memory resulting in overlapping images; and reading a second predetermined area of the memory to form a motion-compensated image.

2. The method as claimed in claim 1, wherein said estimating, storing, reading and overwriting codes a digitized image.

3. The method as claimed in claim 1, wherein said estimating, storing, reading and overwriting decodes a digitized image.

4. The method as claimed in claim 1, wherein the respective image motion vector is determined using the basic position of only the first predetermined area of memory.

5. A system for computer-aided motion compensation in a digitized image, comprising:

a processor to perform motion estimation for an entire image and for a predetermined number of previous images, with a respective image motion vector being determined in each according to a basic position of a first predetermined area of memory; and a memory to store the entire image and the previous images compensated for motion in a chronological sequence, using the respective image motion vector, where the memory is larger than a format of the entire image and each previous image is overwritten with motion compensation by a subsequent image resulting in overlapping images, said processor reading an identical second predetermined area of the memory to form each motion-compensated image.

6. The system as claimed in claim 5, wherein the respective image motion vector is determined using the basic position of only the first predetermined area of memory.

7. A computer-readable storage medium storing a program to control a computer to perform a method for motion compensation in a digitized image, said method comprising:

estimating motion for an entire image, and for a predetermined number of previous images, with a respective image motion vector being determined for each according to a basic position of a first predetermined area of memory;

storing in a chronological sequence of images, the entire image and the previous images in a memory having been compensated for motion, using the respective image motion vector, where the memory is larger than a format of the entire image, thereby overwriting at least a portion of each previous image, with motion compensation by a subsequent image in the memory resulting in overlapping images; and reading a second predetermined area of the memory to form a motion-compensated image.

8. The computer-readable storage medium as claimed in claim 7, wherein the respective image motion vector is determined using the basic position of only the first predetermined area of memory.

9. A method for computer-aided motion compensation in a digitized image, comprising:

estimating motion for an entire image, and for a predetermined number of entire previous images, with a respective image motion vector being determined for each according to a basic position of a first predetermined area of memory;

storing in a memory, larger than any image stored therein, the entire image and previous images in a chronological sequence, each image having been compensated for motion using the respective image motion vector, to overwrite at least a portion of each previous image by a subsequent image with motion compensation resulting in overlapping images in the memory; and reading a second predetermined area of the memory to form a motion-compensated image.

10. The method as claimed in claim 9, wherein the respective image motion vector is determined using the basic position of only the first predetermined area of memory.

11. A method for computer-aided motion compensation in a digitized image, comprising:

estimating motion for an entire image, and for a predetermined number of entire previous images; and storing in a memory, larger than any image stored therein, the entire image and previous images in a chronological sequence, each image having been compensated for motion using a respective image motion vector, to overwrite at least a portion of each previous image by a subsequent image with motion compensation resulting in overlapping images in the memory.

12. The method as claimed in claim 11, wherein the respective image motion vector is determined using a basic position of a single predetermined area of memory in each image to compensate for motion.

* * * * *